April 21, 1970     M. B. ALLEN     3,507,255

ANIMAL-ACTUATED DRINKING VALVE WITH FLOAT

Filed Sept. 11, 1967

INVENTOR.
MAURICE B. ALLEN
BY
Woodhams, Blanchard & Flynn
ATTORNEYS

United States Patent Office 3,507,255
Patented Apr. 21, 1970

3,507,255
ANIMAL-ACTUATED DRINKING VALVE
WITH FLOAT
Maurice B. Allen, Burtonsville, Md., assignor to William
Stone, Jr., Los Angeles, Calif.
Filed Sept. 11, 1967, Ser. No. 666,730
Int. Cl. A01k 7/02; F16k 15/04, 20/04
U.S. Cl. 119—72.5
7 Claims

ABSTRACT OF THE DISCLOSURE

A valve assembly having inlet and outlet body parts and valve mechanism including a checkvalve, a float valve and an animal actuable valve disposed within interconnected passageways extending through the valve body parts. The passageway in the inlet body part is connected to a source of liquid under pressure and the animal actuable valve is located at the opposite end of the passageway in the outlet body part.

Background of the invention

This invention relates in general to a valve assembly for controlling the flow of liquid from a supply thereof under pressure and, more particularly, to a type of valve assembly through the flow of the liquid can be controlled by an animal, such as a small rodent.

A number of animal-actuated, liquid-flow control valve assemblies have been developed, particularly for use in research laboratories, and two of such valve assemblies are disclosed in Patent No. 3,008,451 entitled Animal Drinking Valve and in Patent No. 3,215,119 entitled Animal Drinking Fount. While many of these valve assemblies, including the two aforementioned assemblies, have served useful and specific purposes, there has yet remained the need for a valve construction having a positive closing action (i.e., not reliant upon gravity and/or liquid pressure for proper closing). For example, a valve assembly having positive closing means can be used in a variety of positions.

Where several such valve assemblies are connected to the same supply system, there is the further problem which can develop from cross contamination when a failure occurs in the pressure urging the supply from the source. Accordingly, it is of importance to provide mechanism which isolates that part of the liquid close to the discharge end of the valve assembly so that the liquid in the main supply system is not contaminated, even if the isolated part is.

Accordingly, a primary object of this invention is the provision of an improved valve assembly having an outlet valve resiliently biased in the closed position and capable of animal actuation, said outlet valve being in communication with a storage chamber in which a predetermined amount of liquid near the outlet valve is isolated from the main supply of liquid.

A further object of this invention is the provision of a valve assembly, as aforesaid, in which the backflow of liquid from the storage chamber into the main supply lines is positively prevented so that cross contamination, where several valve assemblies are connected to the same supply line, or other contamination of the main supply is positively prevented.

A further object of this invention is the provision of a valve assembly, as aforesaid, including an outlet valve having a valve head mounted upon a valve guide and integral with resilient means for centering the valve head and holding it in the closed position with respect to a valve seat in order to simplify and minimize the cost of manufacturing and/or maintaining a valve assembly including said outlet valve.

Other objects and purposes of the invention will become apparent to persons familiar with this type of equipment upon reading the following descriptive material and examining the accompanying drawings, in which.

Figure 2:
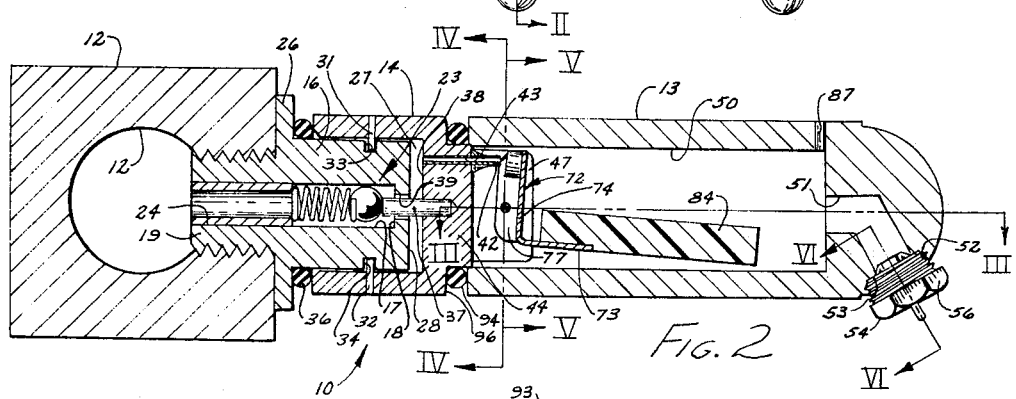
FIGURE 2 is a sectional view taken along the line II—II in FIGURE 1.

For convenience in description, the terms "front" or "outlet" and "rear" or "inlet," or words of similar import, will have reference to the right and left ends, respectively, of the valve assembly appearing in FIGURE 2. The terms "inner," "outer" and derivatives thereof will have reference to the geometric center of said valve assembly and parts thereof.

Summary of the invention

The objects and purposes of the invention, including those set forth above, have been met by providing a valve assembly comprising two substantially cylindrical body parts which are removably connected to each other at adjacent ends. Said parts have interconnecting passageways which extend lengthwise through said body parts. The inlet body part contains a checkvalve to prevent the flow of liquid therethrough when the outlet body part is disconnected from the inlet body part. A float valve is disposed within the outlet body part and controls the flow of liquid from the inlet body part into a storage chamber in the outlet body part. A discharge valve controls the discharge of liquid from the storage chamber and is arranged so that it can be operated by a small animal, such as a rodent. The discharge valve has a resiliently flexible member which is firmly held with respect to the outlet body part so that it yieldably urges the valve head into a closed position while exerting a positive bias against the discharge valve seat.

Detailed description

Figure 1:
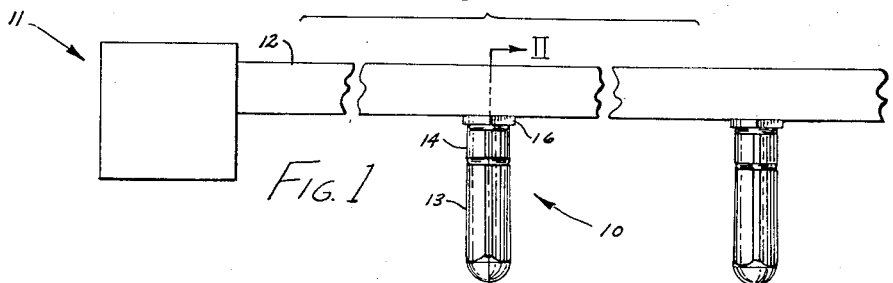
FIGURE 1 is a broken, partially schematic view of a liquid supply system including valve assemblies embodying the invention.

The valve assembly 10 (FIGURES 1 and 2), which has been selected to illustrate a preferred embodiment of the invention, is connected to a source 11 of liquid, such as water, by means of a main supply conduit 12. The valve assembly 10 comprises an outlet or front body part 13, a rear or inlet body part 14 and a coupling 16 for releasably connecting the rear body part 14 to the main conduit 12.

The coupling 16 (FIGURE 2) is preferably substantially cylindrical and has a central passageway 17 with a portion of reduced diameter at its front end defining the checkvalve seat 18. The rear end 19 of the coupling 16 is texternally threaded for threaded engagement with a suitable opening in the main conduit 12 whereby the passageway 17 communicates with the interior 22 of the conduit 12. A preferably spherical checkvalve 23 is held in a normally closed position against the checkvalve seat 18 by a spiral spring which is engaged at its rearward end by the sleeve 24 which is rigidly held within the rearward end of the passageway 17.

The coupling 16 (FIGURE 2) has an integral, radially extending annular flange 26 arranged between its ends so that it will normally engage the adjacent side of the conduit 12 when the coupling 16 is properly mounted thereon. The rear body part 14 has a concentric, rearwardly opening recess 27 of circular cross section into which the front end 28 of the coupling 16 is slideably, snugly and rotatably receivable. A pair of diametrically opposed pins 31 and 32 are mounted in and project inwardly from the circumferential wall of the recess 27, and these pins are slideably received into grooves 33 and 34, respectively, in the peripheral surface of the front end 28 of the coupling 16. The grooves 33 and 34 extend circumferentially and then axially frontwardly in a conventional manner to provide with the pins 31 and 32 a conventional, bayonet-type connection. An O-ring 36 is disposed between the rearward edge of the rear body part 14 and the flange 26 on the coupling 16 to provide a liquid-tight seal therebetween.

A checkvalve actuating pin 37 (FIGURE 2) is rigidly secured in the end wall 38 defining the front end of the recess 27 so that it extends concentrically and loosely through the opening 39 in the checkvalve seat 18. The checkvalve 23 is held by the pin 37 away from the seat 18 when the rear body part 14 is connected to the coupling 16 by the pins 31 and 32. A small tube 42 is rigidly held within an opening 43 through the end wall 38, preferably so that it extends frontwardly from said wall 38.

Figure 3:
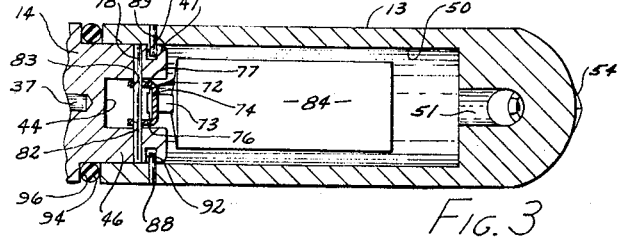
FIGURE 3 is a sectional view taken along the line III—III in FIGURE 2.

The rear body part 14 (FIGURE 3) has a bifurcated front portion 44 of reduced diameter which produces the frontwardly extending and spaced projections 46 and 47.

Figure 4:
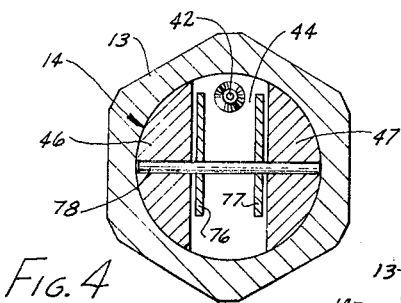
FIGURE 4 is a sectional view taken along the line IV—IV in FIGURE 2.

The front body part 13 (FIGURES 2 and 3), like the rear body part 14, has an external transaxial contour (FIGURE 4) which is out of round to facilitate gripping when the two body parts are rotated relatively for the purpose for effecting their engagement or disengagement. The front body part 13 has a coaxial, rearwardly opening and preferably cylindrical chamber 50 which is closed at its rearward end by the wall 38 (FIGURE 2) when the two body parts are in their normal, connected positions. The front end of the front body part 13 may be approximately semispherical, as shown, but it could have another configuration.

Figure 6:
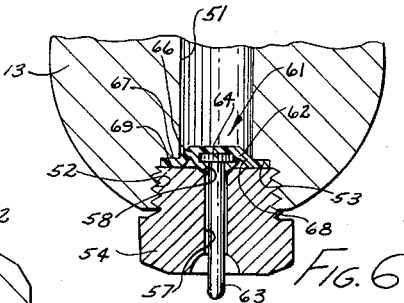
FIGURE 6 is a sectional view taken along the line VI—VI in FIGURE 2.

A discharge passageway 51 (FIGURE 2) communicates with the front end of the chamber 50 and extends frontwardly and downwardly therefrom to open through the lower front end of the front body part 13. The passageway 51 has an enlarged portion 52 which is threaded and provides a shoulder 53. An annular plug 54 is externally threaded at its inner end and has an out-of-round peripheral surface 56 at its outer end, the inner end being threadedly received within the enlarged portion 52 of passageway 51. The plug 54 has a central opening 57 (FIGURE 6) with a conically shaped valve seat 58 at its inner end which communicates with the passageway 51.

Figure 7:
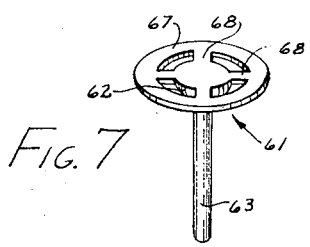
FIGURE 7 is a perspective view of an animal-actuated, outlet valve.

The valve device 61 (FIGURE 7) is comprised of a valve stem 63 having an integral flange 64 (FIGURE 6) at its inner end which is embedded in a valve head 66 having a curved surface sealingly engageable with the valve seat 58. A ring 67 is coaxially connected to the valve head 66 by a plurality of elements 68 defining fluid passageways and, in this particular embodiment, the valve head 66, ring 67 and element 68 are integral and fabricated from a resiliently flexible material.

The ring 67 (FIGURE 6) is clamped between the shoulder 53 and the inner face 67 of the plug 54. The valve head 66, elements 68 and the valve seat 58 are arranged and constructed so that the elements 68 are under tension when the valve head 66 is seated and the plug 54 is in its FIGURE 2 position. Thus, said elements 68 exert a positive and centering bias on the head 66 toward the seated position. The central opening 57 in the plug 54 is of larger cross-sectional area than the cross-sectional area of the stem 63 so that liquid can flow between this valve stem and the walls of the opening 57 when the valve 66 is unseated. The valve stem 63 extends beyond the outer face of the plug 54 where it can be engaged by the animal being serviced to unseat the valve head 66 and discharge the liquid.

An L-shaped float bracket 72 (FIGURE 2) has a substantially horizontal arm 73 and an upright arm 74 with spaced edge flanges 76 and 77 (FIGURE 3) which are substantially parallel and extend between the forwardly extending projections 46 and 47 on the rear body part 14. A pivot pin 78 (FIGURE 3) is mounted in and extends between the projections 46 and 47, respectively. Said pin 78 is slideably and rotatably received through openings 82 and 83 in the flanges 76 and 77 for pivotally supporting the float bracket 72.

A float 84 (FIGURE 3), which is secured to and supported upon the horizontal arm 73, is preferably disposed within the lower part of the chamber 50. A valve 86 is secured to the upright arm 74 and arranged to close the front end of the tube 42 when the float 84 is spaced upwardly from the lower wall of the chamber 50 and the horizontal arm 73 is in a substantially horizontal position. An upwardly opening vent 87 communicates with the front end of the chamber 50.

Figure 5:
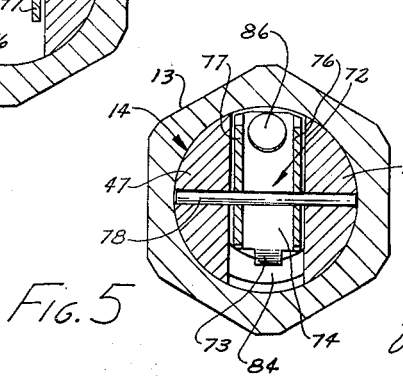
FIGURE 5 is a sectional view taken along the line V—V in FIGURE 2.

The projections 46 and 47 have arcuate outer surfaces (FIGURE 5) which snugly but slideably engage the wall defining the chamber 50 near its rearward end. A pair of pins 88 and 89 (FIGURE 3) are embedded in the front body part 13 near its rearward end and extend radially inwardly into the chamber 50 from diametrically opposite sides thereof. A pair of grooves 92 and 93 in the outer arcuate surfaces of the projections 46 and 47 have circumferentially extending portions and axially frontwardly extending portions whereby the pins 88 and 89 can be received into the grooves 92 and 93, respectively, to provide a bayonet-type connection therebetween. An O-ring 94 encircles the reduced front portion 44 of the rear body part 14 and is engaged between the shoulder 96 on the rear body part 14 and the rearward end of the front body part to seal the connection therebetween.

It will be recognized that the lengthwise axis of the valve assembly 10 could be arranged other than precisely horizontal, as appearing in FIGURE 2, by making a slight adjustment in the shape, size and/or location of the float 84. Moreover, the location of the discharge passageway 51, hence the plug 54, could be changed somewhat without departing from the invention, particularly if the aforementioned changes were made in the position of the float.

Operation

Although a person skilled in the art will be able to determine the operation of the invention from the foregoing descriptive material, a brief summary thereof is now given for convenience. With the valve assembly 10 in normal operating condition, as shown in FIGURE 2, liquid under pressure is urged into the recess 27 in the rear body part 14 and, initially, through the tube 42 into the chamber 50. Such flow will continue until the float is raised by the liquid to a substantially horizontal position where the valve 86 closes the front end of the tube 42. As the liquid rises in the chamber 50, the excess air escapes through the vent 87 so that atmospheric pressure is maintained within the chamber 50.

When the animal desires liquid, it engages the outer end of the valve stem 63 and thereby unseats the valve head 66 so that the liquid in the chamber 50 can move through the discharge passageway 51, around the valve head 66 and through the central opening 57. If a substantial amount of liquid is thereby discharged, the float 84 will be lowered in the chamber 50 and, accordingly, the valve 86 will be unseated so that liquid will flow through the tube 42 until it is again closed by the valve 86. Under normal circumstances, the liquid level within the chamber 50 is somewhat above the highest point in the lower edge of the discharge passageway 51. However, this level is obviously substantially below the front end of the tube 42. Thus, even if the liquid within the chamber 50 becomes contaminated by the animal being serviced, or by fumes entering through the vent 87, such contaminated liquid cannot normally go back through the tube 42 to contaminate the liquid in the supply system.

Although particular preferred embodiments of the invention have been disclosed above for illustrative purposes it will be understood that variations or modifications of such disclosure are fully contemplated.

The embodiments of the invention in which an exclusive property or privilege is claimed are defined as follows:

1. In a system for supplying a liquid under pressure from a source to an animal or the like, a valve assembly comprising:
   wall means defining a liquid chamber and a discharge passageway communicating with said chamber;
   inlet tube means communicating with said source and extending into said chamber;
   float means pivotally supported within said chamber and having a valve thereon for closing said tube means in response to movement of said float when said liquid reaches a predetermined level;
   means defining an annular valve seat encircling said discharge passageway;
   a valve head situated intermediate said valve seat and said chamber and having an inherent resiliency defined by the same being formed under tension to normally urge the same positively into said valve seat in a direction away from said chamber; and
   stem means secured to and extending away from said valve head and along said discharge passageway, at least part of said stem means being spaced lengthwise thereof from the wall defining said passageway, said stem means being engageable by the animal.

2. In a system for supplying a liquid under pressure from a source to an animal or the like, a valve assembly comprising:
   a first body part having an inlet chamber communicating with said source;
   a second body part connected to said first body part and having a storage chamber and a discharge passageway communicating with said storage chamber;
   tube means communicating between said inlet chamber and said storage chamber;
   float means supported within said storage chamber for movement in response to a change in the liquid level within said storage chamber;
   valve means connected to said float means for closing the adjacent end of said tube means when said liquid reaches a predetermined level spaced substantially from said tube means;
   means defining an annular valve seat encircling said discharge passageway;
   a valve head having a surface situated intermediate said valve seat and said storage chamber and having an inherent resiliency defined by the same being formed under tension to normally urge said surface positively into said valve seat in a direction away from said storage chamber; and
   a valve stem secured to and extending away from said surface and along said discharge passageway, at least part of said stem being spaced lengthwise thereof from the wall defining said passageway, said stem being engageable by an animal.

3. A valve assembly according to claim 2, wherein said first body part has a female portion and a male portion separably connected together, said female portion being connected to the front body part and said male portion being connected to said source, and said male portion having an inlet passageway communicating with said inlet chamber;
   checkvalve means disposed within said inlet passageway;
   a checkvalve seat encircling said inlet passageway between said checkvalve means and said inlet chamber;
   resilient means urging said checkvalve means toward the closed position in said checkvalve seat; and
   checkvalve-actuating means on said female portion for holding said checkvalve means away from said closed position when said portions are interconnected.

4. A valve assembly according to claim 2, wherein said storage chamber opens through one end of said second body part;
   a bifurcated portion of reduced diameter extending through said opening into said storage chamber, said float means being pivotally supported upon the bifurcated portion of said first body part;
   bayonet-type connection means between said reduced portion and said front body part; and
   seal means providing a liquid-tight connection between said first and second body parts when they are connected.

5. In a valve assembly for controlling the flow of a liquid under pressure from a source to an animal or the like, said valve assembly including a body part having a discharge passageway with a portion of enlarged cross section adjacent the outer end thereof defining an outwardly facing shoulder, and an annular insert removably held within said enlarged portion of said passageway and having an annular valve seat communicating with said passageway, the combination comprising:
   a valve head having a surface adapted to engage said valve seat and close the opening therethrough;
   valve stem means secured to said valve head and extending away from said surface and through said opening, at least part of said stem means lengthwise thereof being spaced from the wall defining said opening, the outer end of said stem means being engageable by an animal; and
   flexible means having an inherent resiliency defined by the same being formed under tension secured to said valve head and extending away therefrom transaxially of said valve stem means, said flexible means being clamped near its outer edge between said shoulder and the inner end of said insert and constituting a means to produce a positive bias yieldably urging said valve head into a position closing the opening through said valve seat.

6. A valve assembly according to claim 5, wherein said resiliently flexible means includes a ring encircling said valve head and a plurality of radially disposed elements integral with and extending between said ring and said valve head, said ring lying substantially within a single plane substantially perpendicular to the central axis of said valve stem and said valve head projecting through said plane into said discharge passageway.

7. A valve assembly according to claim 6, wherein said valve head is substantially hemispherical and said plane is adjacent to and parallel with the base of the hemisphere when said radially disposed elements are unstressed.

References Cited

UNITED STATES PATENTS

| | | | |
|---|---|---|---|
| 1,746,727 | 2/1930 | Dunlap | 222—444 |
| 2,355,862 | 8/1944 | Harper | 137—525 X |
| 2,586,455 | 2/1952 | Coskey | 251—339 X |
| 2,710,594 | 6/1955 | Thompson | 119—72.5 |
| 3,191,622 | 6/1965 | Finlayson | 137—588 |
| 3,357,406 | 12/1967 | Robinson | 119—75 |
| 3,410,249 | 11/1968 | Allen et al. | 119—72.5 X |

ALDRICH F. MEDBERY, Primary Examiner

U.S. Cl. X.R.

119—75; 137—525; 251—339